United States Patent [19]

Gregory

[11] Patent Number: 4,678,216

[45] Date of Patent: Jul. 7, 1987

[54] THERMOPLASTIC CLAMPING RING

[75] Inventor: Dieter Gregory, Attendorn, Fed. Rep. of Germany

[73] Assignee: Theodor Schemm, Fed. Rep. of Germany

[21] Appl. No.: 835,795

[22] Filed: Mar. 3, 1986

[51] Int. Cl.[4] ............................................. E05C 17/54
[52] U.S. Cl. ...................... 292/256.69; 292/DIG. 38
[58] Field of Search .............. 292/257, 256.61, 256.65, 292/256.67, 256.69, DIG. 38

[56] References Cited

U.S. PATENT DOCUMENTS

| | | | |
|---|---|---|---|
| 1,852,038 | 4/1932 | Young, Sr. .................. | 292/256.69 X |
| 2,304,911 | 12/1942 | Harpold ...................... | 292/256.69 X |
| 2,731,280 | 1/1956 | Goodliffe et al. .......... | 292/256.69 X |

FOREIGN PATENT DOCUMENTS

| | | |
|---|---|---|
| 1053398 | 9/1959 | Fed. Rep. of Germany . |
| 1803826 | 1/1960 | Fed. Rep. of Germany . |
| 2524631 | 12/1976 | Fed. Rep. of Germany . |
| 2525282 | 12/1976 | Fed. Rep. of Germany . |
| 2261197 | 9/1975 | France . |
| 1380658 | 1/1975 | United Kingdom . |
| 1425243 | 2/1976 | United Kingdom . |

Primary Examiner—Richard E. Moore
Attorney, Agent, or Firm—Bacon & Thomas

[57] ABSTRACT

A thermoplastic clamping ring having an U-shaped cross-section, designed for the clamping of covers on barrels, with a clamping lever, pivoted on one end of the thermoplastic clamping ring, and with a clamping link, which is held pivotably on the other end of the thermoplastic clamping ring and is also held pivotably in flanges of the clamping lever. One object of the invention is such a design of the thermoplastic clamping ring that, on the basis of a wall thickness as small as possible and, thus, of a consumption of material as small as possible, the same stiffness can be reached as in the case of a steel clamping ring. As a further object a solid hinge connection free from play, free from rivets, and free from canting, of the clamping lever and of the clamping link with the thermoplastic clamping ring and in regard to one another is intended. Distributed over the circumference, numerous reinforcing ribs, aligned in parallel with the axis of the thermoplastic clamping ring are provided on the outside of the thermoplastic clamping ring and, in addition, ring beads on the borders, into which the reinforcing ribs pass over. On the ends of the thermoplastic clamping ring hook-shaped pivot eyes receive one pivot bolt each, of the clamping link or of the clamping lever, respectively. The clamping link as well as the clamping lever laterally overlap with their flanges the pivot eyes.

4 Claims, 5 Drawing Figures

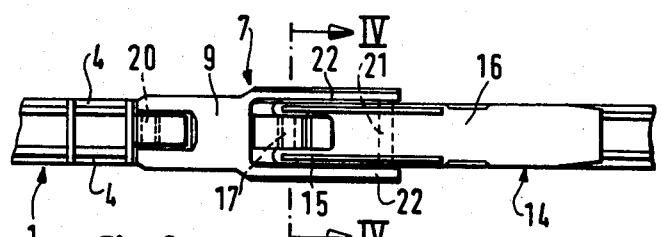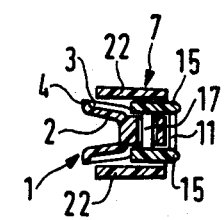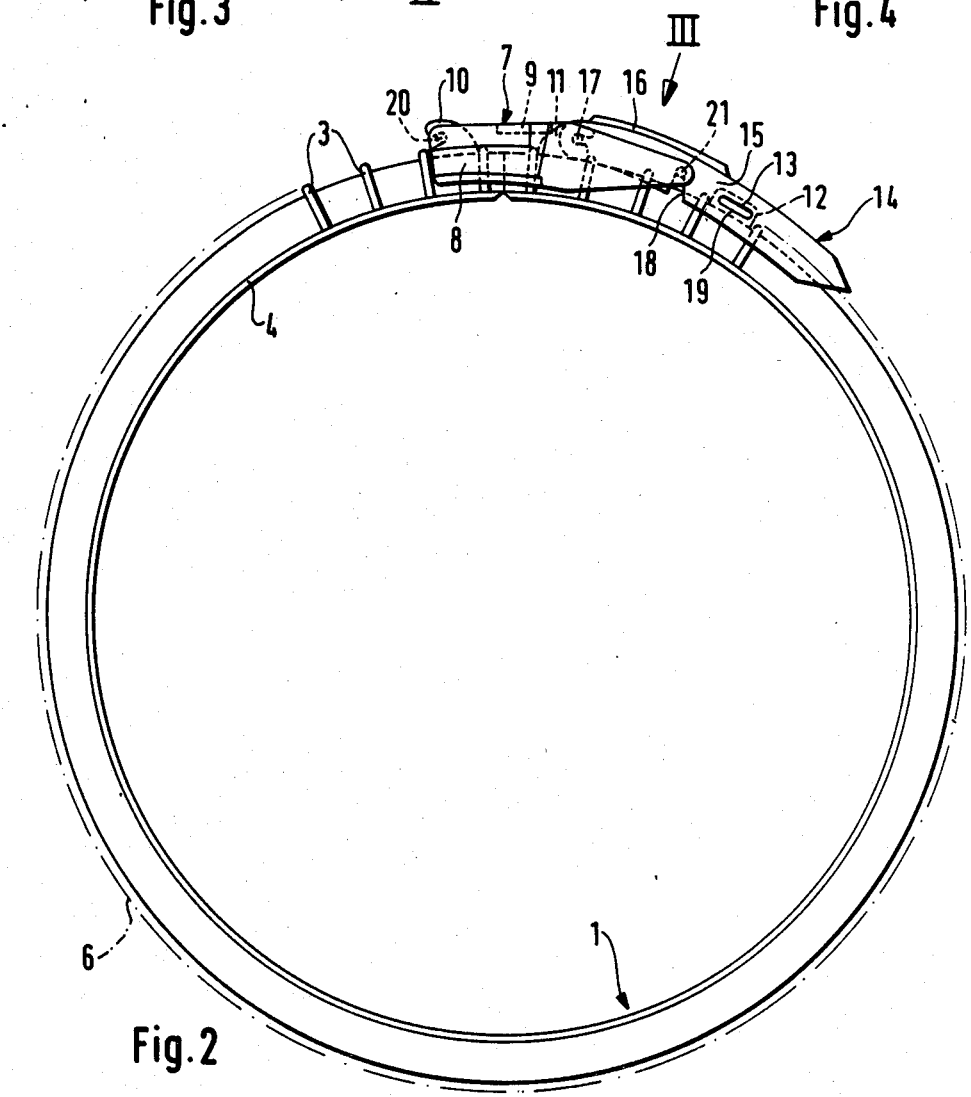

THERMOPLASTIC CLAMPING RING

BACKGROUND OF THE INVENTION

1. Field of the Invention

The invention relates to a thermoplastic clamping ring having an U-shaped cross-section, designed for the clamping of covers on barrels, with a clamping lever, pivoted on one end of the thermoplastic clamping ring, and with a clamping link, which is held pivotably on the other end of the thermoplastic clamping ring and is also held pivotably in flanges of the clamping lever.

2. Description of the Prior Art

A thermoplastic clamping ring of this type is known from the DE-OS No. 25 24 631 (German Offenlegungsschrift No. 25 24 631). Such a thermoplastic clamping ring is placed on the mating flanges of the barrel body and the cover and is tensioned in the circumferential direction, and thereby draws fast the barrel cover on the barrel body in that these flanges are tensioned within the profile of the clamping ring and are drawn against each other. In order to avoid a weakening of the clamping effect, high stiffness is necessary not only in the circumferential direction, but the profile of the thermoplastic clamping ring must possess a high permanent stiffness, in order to avoid an expanding of the profile of the thermoplastic clamping ring so that the flanges of the barrel body and of the cover are kept firmly upon each other.

The FR-OS No. 2 261 197 (Gallay S.A., French Pat. No. 2261197) describes a clamping ring consisting of sheet metal, the profile of which is strengthened by beads. However, such beads are not suitable for a thermoplastic clamping ring.

Such a thermoplastic clamping ring has a smaller stiffness than a clamping ring consisting of steel. Nevertheless, a thermoplastic clamping ring is required if for reasons of corrosion or for reasons of the purefood law simple steel rings or galvanized or tempered steel rings cannot be used. In order to reach the same stiffness as a steel clamping ring, a thermoplastic clamping ring needs, at least, the four-fold wall thickness, as is evident from calculations. That leads to an extremely high material consumption and a correspondingly high price of the thermoplastic clamping ring. The connection, free from play, and, nevertheless, stable connection of the pivoting parts with the thermoplastic ring is difficult.

SUMMARY OF THE INVENTION

One object of the invention is such a design of the thermoplastic clamping ring that, on the basis of a wall thickness as small as possible and, thus, of a consumption of material as small as possible, the same stiffness can be reached as in the case of a steel clamping ring. As a further object a solid hinge connection free from play, free from rivets, and free from canting, of the clamping lever and of the clamping link with the thermoplastic clamping ring and in regard to one another is intended.

According to the invention this object is solved in that, distributed over the circumference, numerous reinforcing ribs, aligned in parallel with the axis of the thermoplastic clamping ring are provided on the outside of the thermoplastic clamping ring and, in addition, ring beads on the borders, into which the reinforcing ribs pass over, that on the ends of the thermoplastic clamping ring hook-shaped pivot eyes receive one pivot bolt each, of the clamping link or of the clamping lever, respectively, and that the clamping link as well as the clamping lever laterally overlap with their flanges the pivot eyes.

The invention differs from the prior art in that the wall of the thermoplastic clamping ring itself can be comparatively thin. On the basis of equal stiffness the wall thickness is approximately as thick or just a little bit thicker than the wall thickness of a steel clamping ring. The necessary stiffness is secured by the reinforcing ribs and the ring beads. Due to the high stiffness also the deformation of the thermoplastic clamping ring under load is so small that it is possible that the thermoplastic clamping ring can be utilized without difficulty instead of a steel clamping ring. Tests have confirmed these considerations. By the rivetfree connection of the clamping lever and the clamping link with the ends of the thermoplastic clamping ring and with one another also the handling of the thermoplastic clamping ring is improved. The thermoplastic clamping ring slides with low friction on the plastic material of the barrel and cover flanges. Consequently, the thermoplastic clamping ring can be handled very easily. The overlapping flanges guarantee freedom from canting and secure a high torsion stiffness of the clamping connection.

In order to keep the material consumption as low as possible and in order to increase the stiffness the reinforcing ribs are provided as flat webs.

The shape of the reinforcing ribs may be provided in a varying manner within the scope of the invention. Also the number of the reinforcing ribs may be adapted to the specific range of application. However, it is essential that the reinforcing ribs increase the stiffness in the axial direction of the clamping ring to the required value.

For a further improvement of the torsion stiffness of the clamping connection and for the guidance of the closure when closing the clamping lever it is provided that the clamping link with its flanges overlaps the clamping lever and the thermoplastic clamping ring and engages with its pivot bolt, distant form the pivot eye, bearing slots of the flanges of the clamping lever.

BRIEF DESCRIPTION OF THE DRAWING

One embodiment of the invention will be described in the following with reference to the attached drawings, wherein FIG. 2 is a corresponding view of the thermoplastic clamping ring in the closed condition, FIG. 3 is a view of the clamping connection in arrow direction III, FIG. 4 is a section along line IV—IV in FIG. 3, whilst

DESCRIPTION OF THE PREFERRED EMBODIMENT

Figures 1, 5:
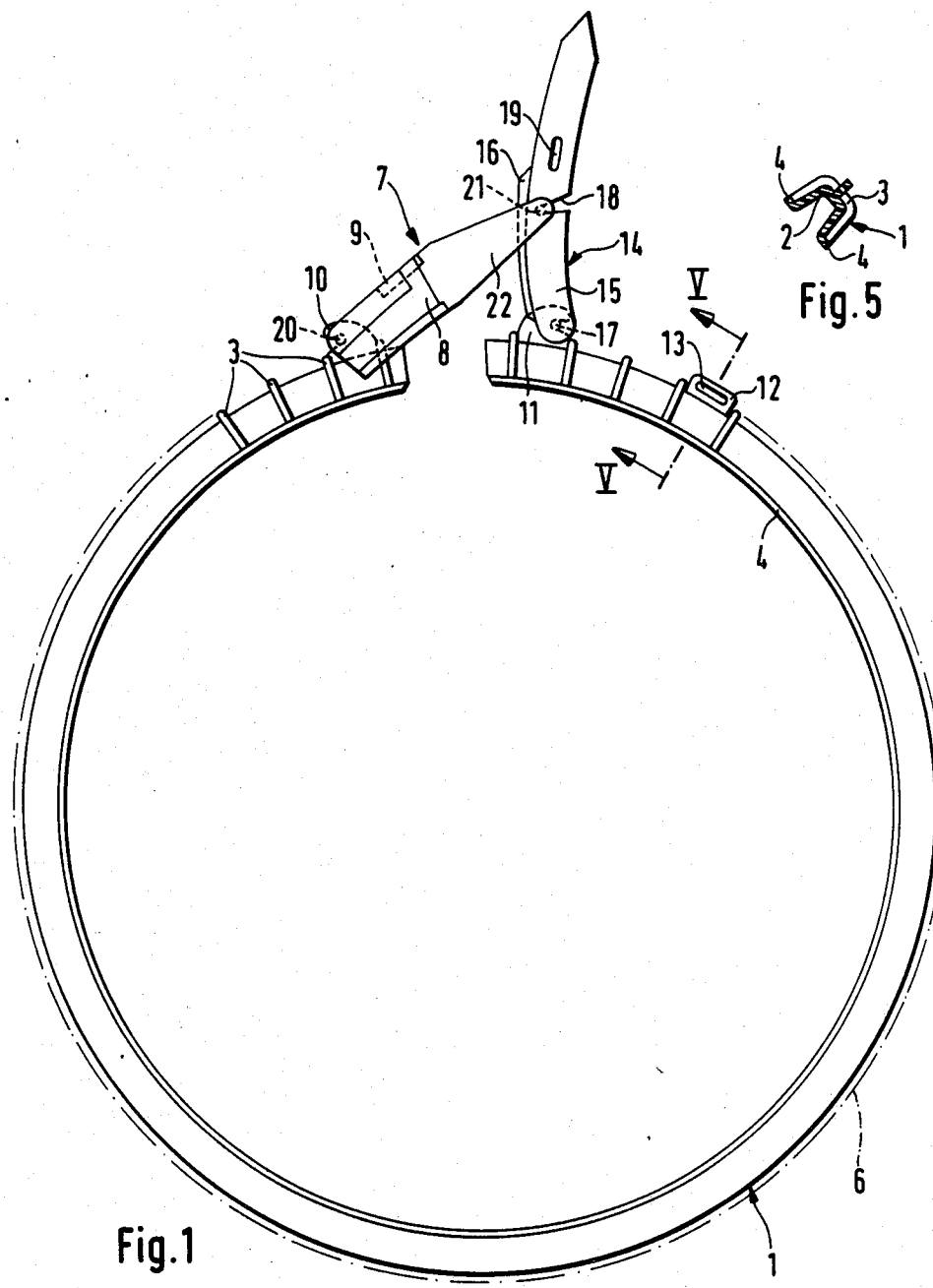
FIG. 1 shows a total view of a thermoplastic clamping ring according to the invention in the opened condition.
FIG. 5 is a section along line V—V in FIG. 1.

FIG. 1 shows the thermoplastic clamping ring 1 in the opened condition prior to placing same on a barrel. The thermoplastic clamping ring 1 has a substantially U-shaped profile 2, as is evident from FIG. 5. The U-shaped profile 2 is open against the axis of the thermoplastic clamping ring 1. On the borders of the U-shaped profile 2 ring beads 4 are formed, each of which being directed outwards. On the outside of the thermoplastic clamping ring 1 reinforcement ribs 3 in the form of flat webs are provided, which extend in parallel with the axis of the thermoplastic clamping ring 1 and enclose the profile 2 on the entire outside. The reinforcing ribs 3 pass over into the ring beads 4 so that a latticed stiffening structure is created. The reinforcing ribs 3 may possess reinforcement of the cross-section in the edge ranges of the thermoplastic clamping ring 1, in order to secure an increased stiffness by this measure. The shape and particularly the outer contour as well as the quantity of the reinforcing ribs is to be determined in the light of the desired stiffness. Of course, modifications of the shape are possible in the specific case.

The reinforcing ribs 3 contribute to the increase of stiffness of the thermoplastic clamping ring 1. In particular it is reached that the stiffness in the direction of the axis of the thermoplastic clamping ring is high so that a spreading of the flanges of the U-shaped profile 2 is impossible.

In FIG. 1 some reinforcing ribs 3 are shown only. The reinforcing ribs 3 are continued in a corresponding manner over the entire periphery of the thermoplastic clamping ring 1, as is indicated by the dot-dash line 6.

The thermoplastic clamping ring 1 is injection-moulded in one piece in the shape as shown in FIG. 1. On the ends of the thermoplastic clamping ring hook-shaped pivot eyes 10 and 11 are arranged. Each pivot eye 10 and 11 has the hook-shape as shown, the hook-opening being directed away from the respective end of the thermoplastic clamping ring 1. The pivot eyes have a width, which corresponds approximately to the width of the back of the thermoplastic clamping ring. Furthermore, in the vicinity of one end of the clamping ring a projection 12, having a transverse slot 13, is provided. This transverse slot 13 serves for the reception of a safety strap.

A clamping lever 14 has a substantially U-shaped cross-section, two flanges 15 being connected to each other by a back 16. The back 16 has, if necessary, a profile for the stiffening of the clamping lever 14. Between the ends of the flanges 15 a pivot bolt 17 is provided, which fits into the reception of the pivot eye 11. This reception of the pivot eye 11 comprises a slight undercut so that the pivot bolt 17 can be pushed into the reception of the pivot eye 11. In addition, in the flanges 15 bearing slots 18 are provided, the apical receptions of which comprise an undercut. Finally, the flanges 15 comprise openings 19, which will overlap the transverse slot 13 so that in the closed position according to FIG. 2 the safety strap, not shown, can be inserted through the openings 19 and the transverse slot 13.

In addition, a clamping link 7 is provided, which consists of two opposed flanges 8 and a back portion 9. On the ends between the flanges 8 pivot bolts 20, 21 are provided. The pivot bolt 20 can be forced into the reception of the pivot eye 10. The pivot bolt 21 is received in the bearing slots 18, the undercut of the bearing slots 18 securing a clamping hold.

The flanges 8, in the range of the pivot bolt 20, have a distance from each other, which corresponds to approximately the outer width of the thermoplastic clamping ring 1. The flanges 8 then are continued in end portions 22, which have a larger distance from one another, which distance corresponds to the outer width of the clamping lever 14, as is particularly clearly evident from FIGS. 3 and 4.

This configuration renders possible, on the one hand, a neat and proper guidance of the clamping lever and of the clamping link when closing the clamping closure and, in addition, a transverse guidance of the ends of the clamping ring. Thereby it is reached that in the closed condition according to FIGS. 2 and 3 the ends of the thermoplastic clamping ring are held together in the axial direction by the clamping lever closure and any canting cannot occur in this range. This is extremely important for the strength of the clamping closure and for the function thereof.

The thermoplastic clamping ring 1, the clamping lever 14 and the clamping link 7 are thermoplastic injection mould parts. These parts are inserted into one another in the described manner in that the specific pivot bolts are forced into the pivot eyes. In the opened condition according to FIG. 1 the thermoplastic clamping ring together with the closure forms an operable unit, which may be placed upon a barrel body.

After the placing, the clamping lever 14 is pivoted counterclockwise. Thereby the thermoplastic clamping ring 1 is tensioned in the circumferential direction so that it takes the closing position according to FIG. 2 and clamps the barrel cover on the barrel body in that the flanges or borders of the barrel cover and of the barrel body are tensioned in regard to each other between the flanges of the thermoplastic clamping ring 1. The reinforcing ribs secure a high stiffness so that it is not possible for the flanges 5 to spread out. Thereby the clamping effect is maintained. Calculations and tests have produced the result that the configuration as shown of the thermoplastic clamping ring guarantees an increase of the stiffness by the reinforcing ribs 3 so that the wall thickness of the profile 2 must be just a little thicker as compared with a steel clamping ring. The clamping closure contributes, by the lateral guiding of the flanges, to the stiffness and to the freedom from canting of the arrangement.

I claim the following:

1. A clamping ring for clamping covers on barrels and having a U-shaped cross-sectional configuration and two ends, and provided with a clamping lever with spaced flanges pivotally connected to one end of the clamping ring, and a clamping link with spaced flanges which is both pivotally connected to the other end of the clamping ring and pivotally connected to the flanges of the clamping lever, which clamping ring comprises:
    (a) a plurality of reinforcing ribs circumferentially spaced around the exterior of the clamping ring and disposed in parallel with the central axis of the clamping ring;
    (b) the clamping ring including a pair of inner peripheral edges, with each edge terminating in an outwardly directed ring bead;
    (c) the reinforcing ribs extending around the exterior of the clamping ring to the ring beads;
    (d) a hook-shaped pivot eye carried on each end of the clamping ring;
    (e) a pivot bolt disposed through each pivot eye;
    (f) the clamping lever being pivotally connected to one pivot eye by a corresponding pivot bolt and the clamping link being pivotally connected to the other pivot eye by a corresponding pivot bolt; and
    (g) one pivot eye being disposed between a corresponding pair of spaced flanges of the clamping lever and the other pivot eye being disposed between a corresponding pair of spaced flanges of the clamping link.

2. The clamping ring of claim 1 wherein each reinforcing rib is in the configuration of a flat web.

3. The clamping ring of claim 1 wherein the spaced flanges of the clamping link overlaps both the spaced flanges of the clamping lever and the clamping ring, the clamping lever including a pair of spaced bearing slots, and a pivot bolt disposed within the bearing slots for pivotally connecting the clamping link to the clamping lever at a point spaced from the pivot eye of the clamping link.

4. The clamping ring of claim 1 wherein the clamping ring, clamping link and clamping lever are each integrally formed of thermoplastic material.